Figure 1:
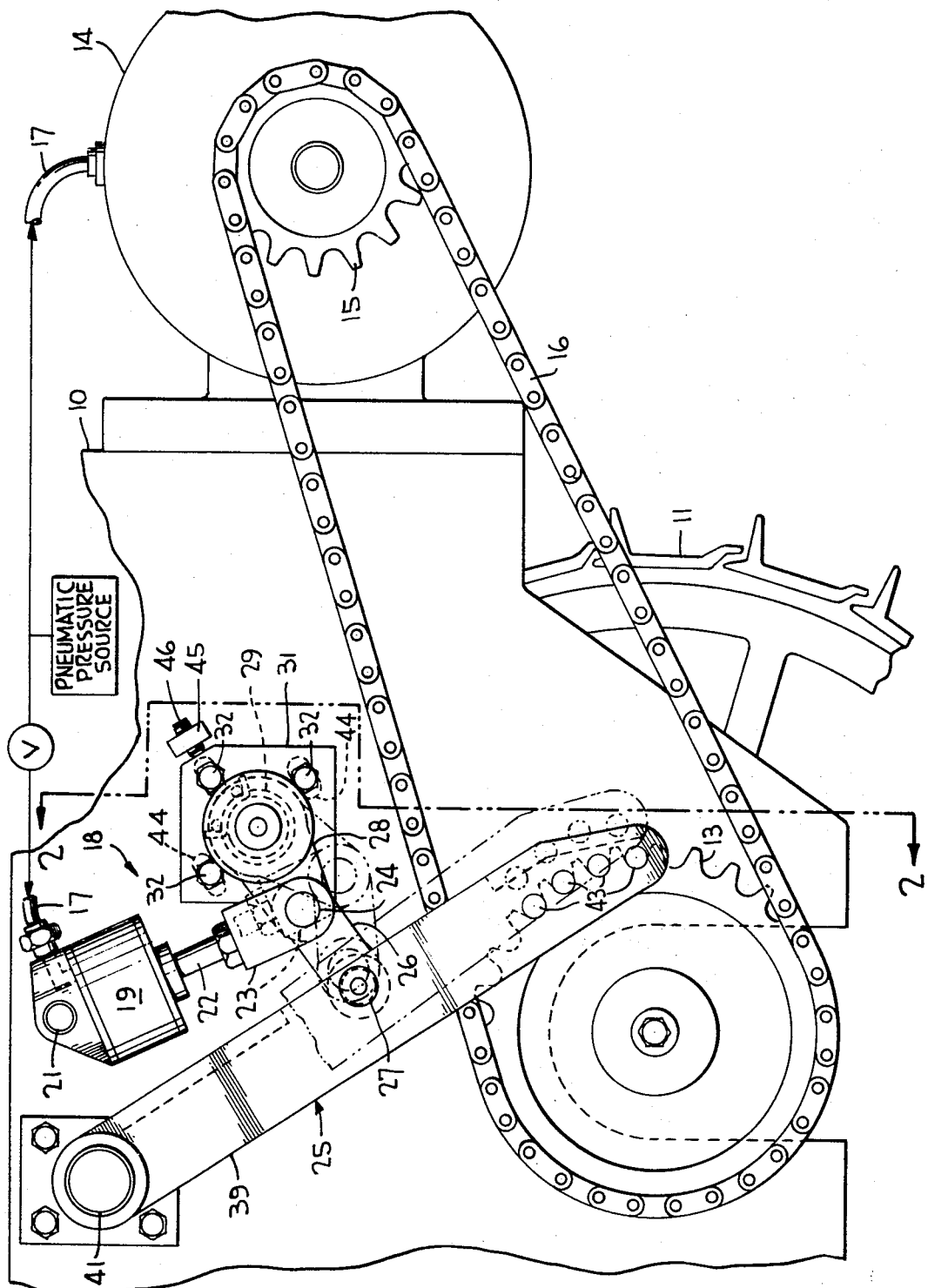

United States Patent
Buress, III

[15] 3,704,757
[45] Dec. 5, 1972

[54] AUTOMATIC BRAKING MECHANISM
[72] Inventor: John W. Buress, III, Winston-Salem, N.C.
[73] Assignee: Drill Carrier Corporation, Salem, Va.
[22] Filed: May 17, 1971
[21] Appl. No.: 143,982

[52] U.S. Cl. ................180/6.48, 74/411.5, 188/69, 188/170, 192/3 R, 305/9
[51] Int. Cl. .........................B62d 11/04, F16d 65/24
[58] Field of Search ...180/6.48; 188/31, 60, 69, 170; 305/9; 192/3 R; 74/411.5

[56] References Cited

UNITED STATES PATENTS

| | | | |
|---|---|---|---|
| 2,994,393 | 8/1961 | Whaley | 180/6.48 |
| 3,371,735 | 3/1968 | Masera | 305/9 X |
| 2,295,196 | 9/1942 | Barr | 188/170 |
| 3,580,345 | 5/1971 | Brown | 305/9 X |
| 2,796,301 | 6/1957 | Lear et al. | 305/9 |
| 2,860,731 | 11/1958 | Hause | 188/69 |

FOREIGN PATENTS OR APPLICATIONS

| | | | |
|---|---|---|---|
| 650,990 | 10/1928 | France | 188/31 |
| 84,061 | 8/1935 | Sweden | 188/170 |

*Primary Examiner*—Benjamin Hersh
*Assistant Examiner*—Leslie J. Paperner
*Attorney*—Watson, Cole, Grindle & Watson

[57] ABSTRACT

Braking mechanism for a traction apparatus of the opposed traction unit type, automatically operable independent of the pneumatic control for the service brakes and operated by means of an air cylinder through the same pneumatic pressure source used for the chain drive of each traction unit. The braking mechanism includes a pivotally-mounted brake arm having sprocket teeth engaging means thereon movable into and out of engagement with the sprocket teeth of each chain drive sprocket wheel by means of a toggle linkage which, when collapsed by the air cylinder, moves the brake arm out of engagement and, when moved slightly past a dead-center position by the air cylinder, moves the brake arm into engagement under the assistance of a torsion spring.

6 Claims, 2 Drawing Figures

INVENTOR,
JOHN W. BURRESS, III

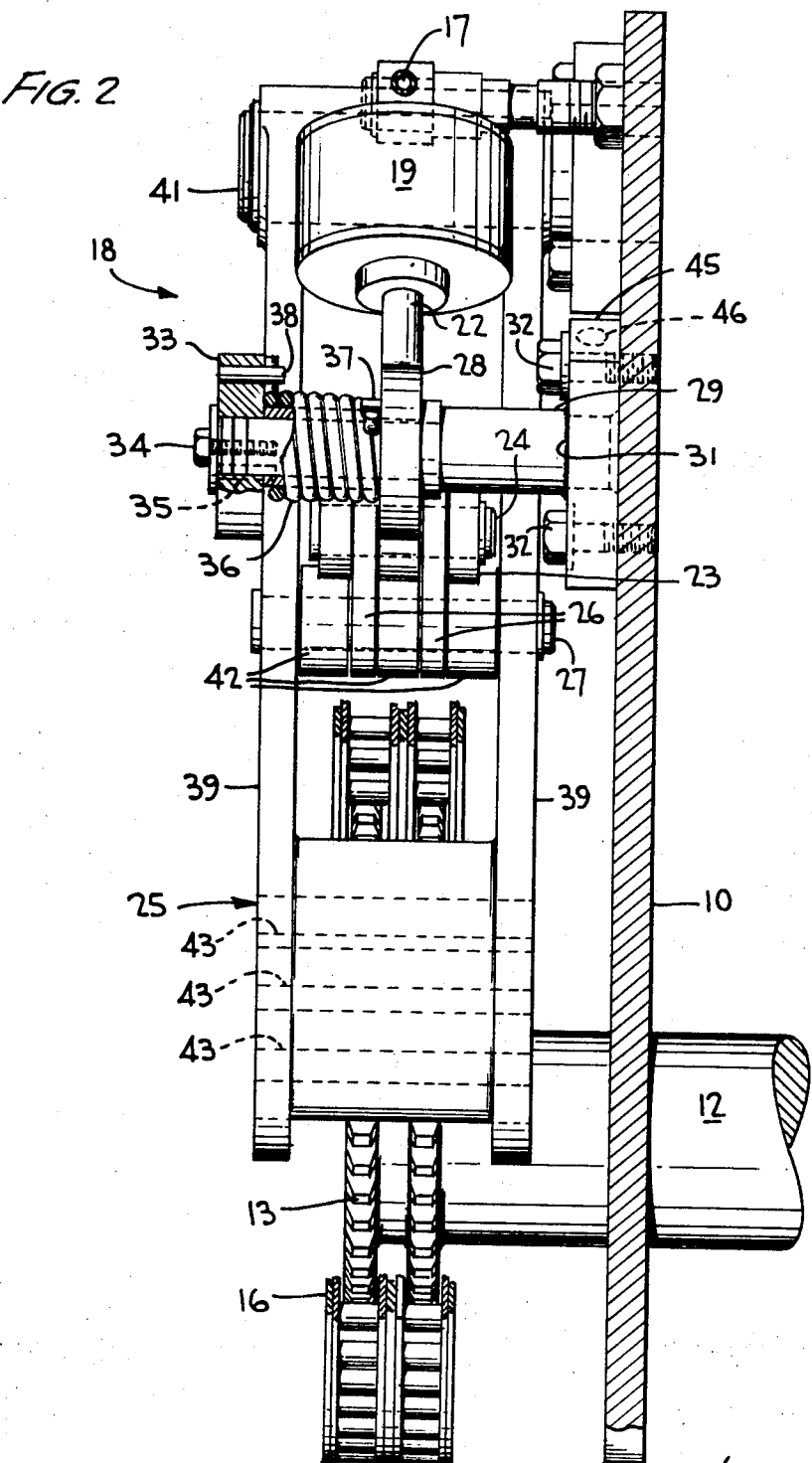

AUTOMATIC BRAKING MECHANISM

This invention relates generally to traction apparatus of the opposed traction unit type and more particularly to an automatic braking mechanism for such apparatus which serves to brake each traction unit through the same pneumatic pressure source used for the chain drive of each traction unit.

In the known traction apparatus each traction unit is provided with a braking and clutching arrangement by pneumatic action for controlling the steering operation of the apparatus. The brakes may, of course, be applied when the apparatus is at rest or at an incline but, if left standing for any significant length of time, a leak in the pneumatic control line may cause the brakes to release.

It is therefore an object of the present invention to provide a braking mechanism which is operable automatically, is independent of the pneumatic controls for the service brakes and is operated from the same pneumatic power source which controls operation of the pneumatic motor which drives each chain of the opposed traction unit.

Another object of the present invention is to provide such a mechanism wherein an air cylinder and piston unit is operable through the chain drive air source to effect a braking action of one of the sprocket wheels of the traction units in such a manner that the brake is thereby retracted when the drive motors are actuated to drive the traction unit and the brake is applied when the drive motors are not actuated.

A further object of the present invention is to provide such a braking mechanism including braking arm means which are moved by the air cylinder and piston unit into and out of braking engagement with the one sprocket wheel by means of a toggle link mechanism which, when moved slightly off of a dead-center position during retraction of the piston of such unit in the absence of pressure from the pneumatic pressure source, the braking arm means is caused to move into braking engagement with the one sprocket wheel; conversely, full collapse of the toggle link mechanism during extension of the piston of such unit controlled by the air pressure from the pneumatic pressure source, causes the brake arm means to be moved out of braking engagement with the one sprocket wheel.

A still further object of this invention is to provide such a braking mechanism wherein a torsion spring is provided for assisting in the retraction of the piston within the unit, the off dead-center disposition of the toggle mechanism assuring continued braking engagement even in the event of torsion spring failure.

A still further object of the present invention is to provide such a braking mechanism wherein the brake arm means is provided with sprocket engaging means for intermeshing with the teeth of the one sprocket wheel to thereby positively prevent any movement thereof.

Other objects, advantages and novel features of the present invention will become apparent from the following detailed description of the invention when considered in conjunction with the accompanying drawings wherein:

FIG. 1 is a side elevational view of the braking mechanism in accordance with the present invention for one of the partially shown traction units; and FIG. 2 is an elevational view of the braking mechanism taken along the line 2—2 of FIG. 1.

Turning now to the drawings wherein like reference characters refer to like and corresponding parts throughout the several views there is shown a portion of a frame 10 of a traction apparatus in conjunction with other elements of such apparatus as is necessary to adequately describe the present invention. Only one of a pair of traction units such as 11 is shown along with its accompanying drive control means in order to simplify the disclosure.

Each traction unit is mounted in some conventional manner to the frame 10 with its axle 12 having at one end an idler sprocket wheel 13. An air driven motor means 14 is also mounted on the frame for pneumatically driving a drive sprocket wheel 15 with such drive motion being transmitted to the idler sprocket wheel by the conventional means of a chain 16 extending about each sprocket wheel. A pneumatic pressure source, shown schematically in FIG. 1, is provided for supplying air pressure through air line 17 to the air motor 14 which, in conjunction with well-recognized brake and clutch connections, operate each traction unit to propel and steer same. Valving V, also s shown schematically in FIG. 1, is provided along air line 17 for controlling the air supply to drive motor 14 in the normal manner.

The braking mechanism, referred to generally by reference numeral 18, is controlled through air line 17 from the same pneumatic pressure source and valving which controls the air supply for the drive motor. It will be seen that the braking mechanism 18 is designed in such a manner that when the valving V is actuated to supply the drive motor 14 with air the braking mechanism is likewise operated so as to release the braking action thereof during movement of each traction unit. Conversely, when the air supply through valving V is cut off for the drive motors it is likewise automatically cut off for the braking mechanism so that a braking action is effected until it is once again released through the air supply which simultaneously controls the motor drive.

The braking mechanism 18 is actuated by means of its air cylinder and piston unit 19 which is secured at one end as at 21 to the frame 10 and which has a piston rod 22 extending outwardly therefrom. The cylinder unit is operably connected with the pressure source and valving through air line 17. A piston rod and adapter 23, in the form of a yoke which has a pin 24 extending transversely through its two arms as most clearly shown at FIG. 2, is provided at the free end of piston rod 22. A toggle link mechanism is supported by transverse pin 24 by means of which a brake arm assembly 25 is made to move into and out of braking engagement with sprocket wheel 13. This toggle mechanism comprises link members 26 pivotally secured at one end to transverse pin 24 and at their opposite ends pivotally to brake arm assembly 25 through a pin member 27. The toggle linkage mechanism further includes a link member 28 pivotally secured at one end to pin 24 while at its opposite end is pivotally secured to a pin member 29. This pin member 29 is fixedly secured at one end to the frame 10 through a base plate 31 by means of threaded fasteners 32. The free end of pin 29 has a torsion plate 33 fixed thereon, as by threaded screw member 34, and held against rotation by means of a key pin 35. Between the torsion plate 33 and the link member 28 a torsion spring 36 is provided and freely wound about the pin member 29 with one of its ends being secured to a pin member 37 on link 28 and its opposite end secured to a pin 38 of plate 33. The torsion spring is so disposed as to tighten as the link member 28 is moved in a clockwise direction as seen in FIG. 1.

The brake arm assembly 25 comprises a pair of substantially identical arms 39 pivotally secured at one end to frame 10 about a pivot pin 41 with the transverse pin 27 also extending therethrough between its ends, spacers 42 being provided for the link members 26. The arms 29 are spaced apart a distance greater than the thickness of sprocket wheel 13 and, at the free ends of the arms, sprocket engaging means is provided in the form of elongated rollers 43 rotatably secured between arms 39 and being of such a diameter approximately equal to the grooved diameter of each sprocket wheel tooth of sprocket 13.

Also, it should be noted that base plate 31 may be adjusted toward and away from sprocket wheel 13 for adjusting the entire braking mechanism 18 if it is desired to increase or decrease the intermeshing engagement between rollers 43 and the teeth of wheel 13. Such an adjustment is simply effected by means of an allen screw 46 located within adjustment block 45, one end of the screw bearing against plate 31. Fasteners 32 extend through elongated bores 44 to accommodate movement of the plate toward and away from wheel 13.

The operation of the breaking mechanism will now be described. Braking action between the arm assembly 25 and the sprocket wheel 13, shown in solid lines in FIG. 1, is effected through the air control by valving V which regulates the pressure from the air source and cuts it off in the air line 17 so that the air traction unit is stopped. Since the braking mechanism 18 is also operably connected with the valved air pressure source through air line 17, the piston rod 22 of the air cylinder and piston unit 19 automatically retracts for lack of air pressure within this unit. Retraction by the piston rod is enhanced by means of torsion spring 36 which releases its built up torsional force after having been uncoiled during brake release as will be explained hereinafter. During retraction the toggle linkage is urged into an extended and nearly substantially aligned position of the links but slightly past a dead-center position so as to cause a spontaneous locking of the links in their extended condition in which condition the brake is urged into operative engagement with the sprocket 13 as shown in full lines in FIG. 1. By reason of this over dead-center relationship of the toggle linkage, the brake will remain applied even in event of failure of the coil spring 36. In other words, this is a fail safe feature such that unless the driving motor is actuated to drive the endless track, the brake is effectively applied and will be maintained applied. The rollers 43 of the brake arm assembly 25 are conveniently adapted for meshing engagement with the sprocket teeth and, because of the cooperating conformation of the sprocket teeth themselves, it can be seen that even though the rollers when initially engaged may strike the ends of the sprocket teeth, only a slight rolling or movement of the sprocket is required in either direction to firmly engage the rollers with the teeth.

When, on the other hand, the driving motor 14 is actuated and air is simultaneously admitted to the air cylinder and piston unit 19, the piston rod 22 is extended so that the knee of the toggle linkage is broken and is urged to the position shown in broken lines in FIG. 1 thereby positively retracting the free end of the brake arm assembly 25 from braking engagement with the sprocket 13. In this condition, torsion spring 36 is slightly wound-up on the member 29.

From the foregoing, it can be seen that a simple yet highly effective braking mechanism has been devised for effectively braking the traction units automatically upon discontinuance of the air pressure for the air motor driving means for such traction units. The present mechanism is not only fail safe and locked in place during braking engagement with the sprocket wheel, but is absolutely independent of the service braking system and easy to manufacture and install on existing traction apparatus as well as being economical and simple in its design.

Obviously many modifications and variations of the present invention are possible in the light of the above teachings. It is, therefore, to be understood that within the scope of the appended claims the invention may be practiced otherwise than as specifically described.

What is claimed is:

1. In a traction apparatus having a frame, opposed traction units mounted on said frame, a driving connection for each said unit comprising pairs of spaced sprocket wheels on said frame and an endless chain extending about each said wheel pair, pneumatically operated means for driving each of said wheel pairs, a pneumatic pressure source and valving for regulating the pneumatic pressure, a braking mechanism on said frame for each said unit including movable means for braking one of said sprocket wheels, each said mechanism being pneumatically interconnected with each said valved pneumatic pressure source, each said mechanism also including an air cylinder piston unit connected with said movable means and operable through said source to retract said piston to thereby actuate said movable means into braking engagement with said one sprocket wheel when the pneumatic pressure is discontinued, and to extend said piston to thereby actuate said movable means out of braking engagement with said one sprocket wheel when the pneumatic pressure is valved on, whereby said one sprocket wheel is braked only during inoperation of the driving means, said piston unit being connected with said movable means by a toggle linkage comprising two link member sets each pivotally connected at one end to the piston rod of said unit thereby defining a toggle knee, and pivotally connected at their other ends, respectively, to said movable means and to said frame, the toggle knee during full retraction of said piston rod lying slightly out of alignment with said link member other ends thereby defining an off-dead-center arrangement of said link members whereby any tendency for accidental release of the brake is substantially avoided.

2. In the traction apparatus according to claim 1 wherein the pivotal connection between said link member other end and said frame includes a pivot pin member fixedly secured at one end to said frame, a disk member secured to the other of said pin member, and a torsion spring disposed in a piston retracting position about said pin member, opposite ends of said spring being secured respectively to said disk member and to said link member which is pivotally connected to said pin, said torsion spring thereby assuring a full retraction of said piston within said cylinder and piston unit during the locking engagement of said mechanism.

3. In the apparatus according to claim 4 wherein said pivot pin member is secured to said frame through a base plate having bores therein slightly elongated in a direction towards said arm members, securing means extending through said elongated apertures, and adjustment means on said frame near said base plate for adjusting said base plate and therefore said arm members toward said one sprocket wheel.

4. In the traction apparatus according to claim 1 wherein said movable member comprises a braking arm means pivotally secured at one end to said frame and having sprocket teeth engaging means at its free end whereby said one sprocket wheel is braked as said teeth engaging means intermesh with the teeth of said one sprocket wheel driving extension of said piston rod causing collapse of said link member sets at said knee.

5. In the traction apparatus according to claim 5 wherein said braking arm means comprise a pair of parallel arm members spaced apart a distance greater than the thickness of said one sprocket wheel whereby said arm members are disposed on opposite sides of said endless chain.

6. In the apparatus according to claim 5 wherein said sprocket teeth engaging means comprises a plurality of elongated rollers disposed in parallel relationship with the axis of said one sprocket wheel.

* * * * *